Dec. 11, 1951   O. R. PETERSON ET AL   2,578,487
FLEXIBLE MOTOR FLUID OPERATED CLUTCH
Filed Nov. 19, 1945   4 Sheets-Sheet 3

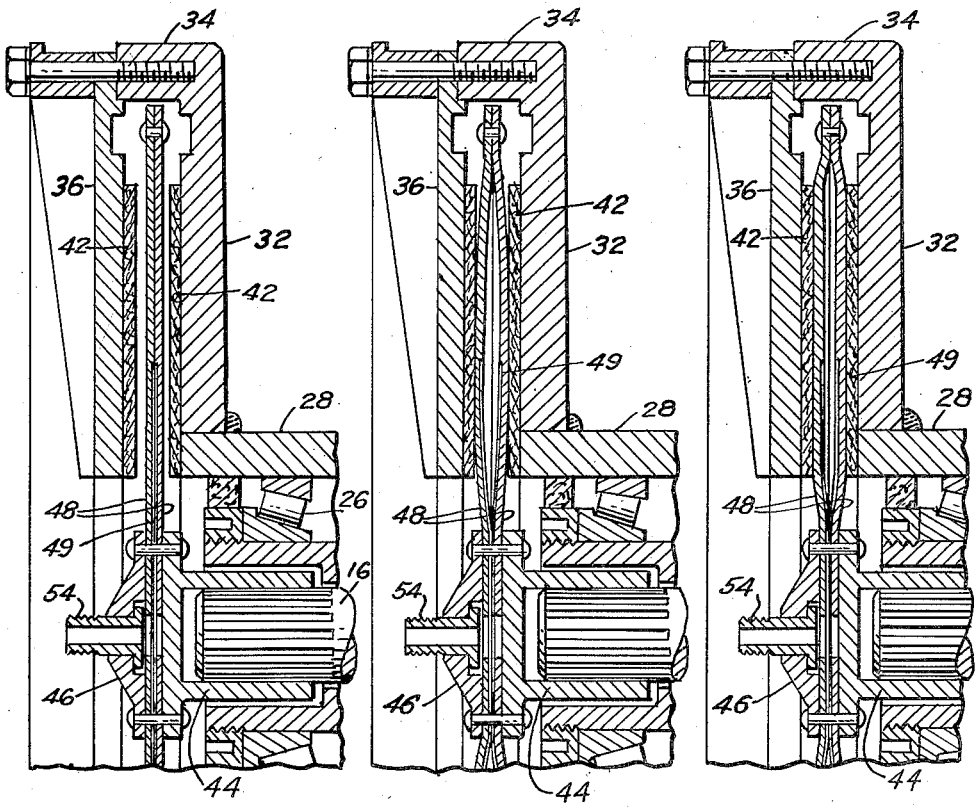

INVENTORS
OSCAR R. PETERSON
ROBERT A. PETERSON
BY
A. Durham Owen
ATTORNEY.

Dec. 11, 1951   O. R. PETERSON ET AL   2,578,487
FLEXIBLE MOTOR FLUID OPERATED CLUTCH
Filed Nov. 19, 1945   4 Sheets-Sheet 4

INVENTOR.
OSCAR R. PETERSON
ROBERT A. PETERSON
BY
ATTORNEY.

Patented Dec. 11, 1951

2,578,487

UNITED STATES PATENT OFFICE 2,578,487

FLEXIBLE MOTOR FLUID OPERATED CLUTCH

Oscar R. Peterson, Oakland, and Robert A. Peterson, San Leandro, Calif.

Application November 19, 1945, Serial No. 629,341

8 Claims. (Cl. 192—88)

1

The present invention relates to friction clutches and, more particularly, to a fluid pressure clutch.

Clutches of the various types hitherto in general service, while efficient, require a high degree of skill for the repair or replacement of worn parts. To replace worn faces ordinarily involves pulling bearings or intricate shimming operations. Furthermore, careful alignment of all the elements is usually a prerequisite to satisfactory clutch operation.

The most important object of our invention is to provide an efficient, rugged clutch assembly which is replaceable as a unit by the simplest of operations and in the minimum time. We contemplate the provision of pre-assembled clutch units capable of being slipped into place by an unskilled workman.

Another object of the invention is to provide a self-adjusting clutch unit which will automatically adapt itself to the conditions encountered on installation.

A further object of the invention is to provide a full-floating clutch which floats on the end of a splined shaft and can be installed or removed from the end of the shaft without the necessity for first severing any connection with the shaft.

An important feature of our invention resides in a hub member adapted to float on the end of a splined shaft and carrying a pair of metal disks sealed at their periphery and adapted to be spread by fluid pressure to engage clutch faces provided on complementary elements associated with the shaft.

Another feature of our invention consists in a hub floating in splines on the end of a shaft, carrying a pair of expansible disks, and provided with a floating bushing through which fluid may be passed to separate the disks and force them into frictional engagement with clutch faces formed on suitable complementary elements.

The present application is a continuation-in-part of our co-pending application Ser. No. 532,099 for a Cable Winch, filed April 21, 1944, which issued on June 1, 1948, as Patent No. 2,442,510.

Figure 1:
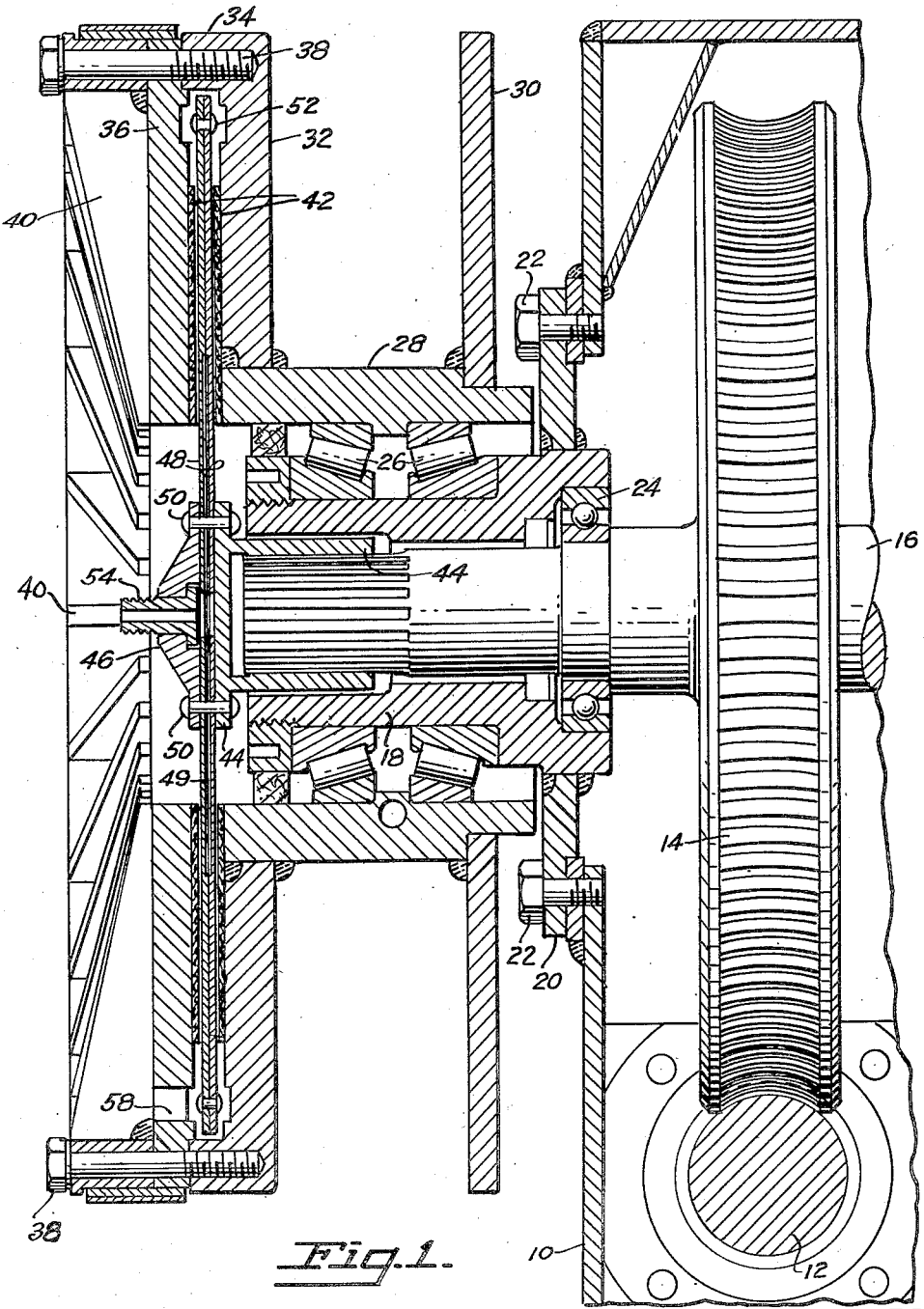

The objects and features of our invention will be more readily understood and appreciated from the following detailed description of preferred embodiments thereof selected for purposes of illustration and shown in the accompanying drawings, in which:

Fig. 1 is a view partly in elevation and partly

Figure 5:
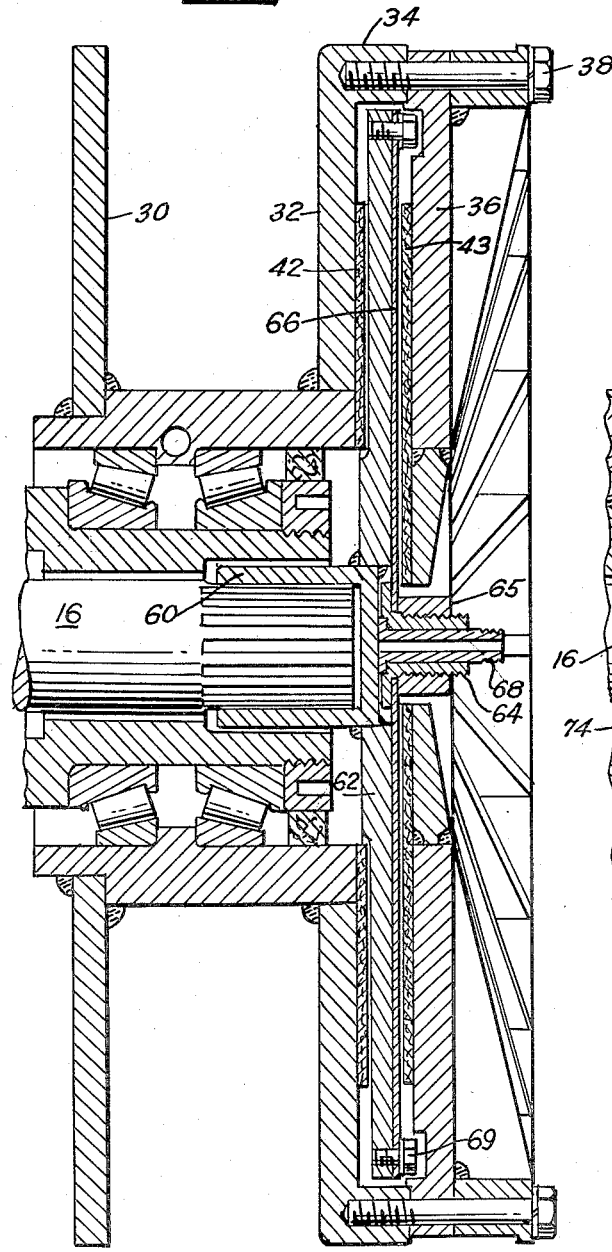
Figure 6:
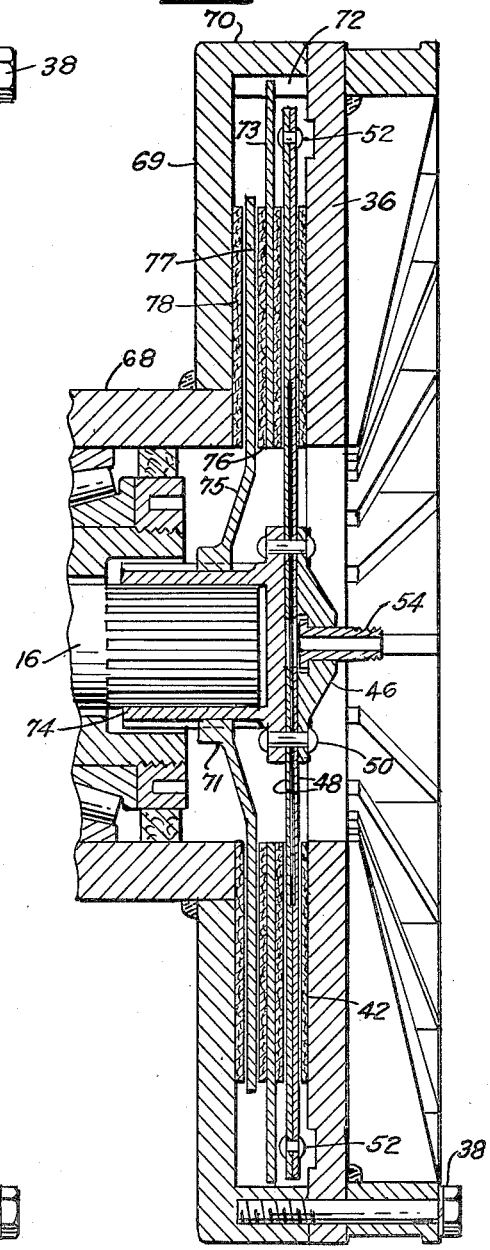
Figure 7:
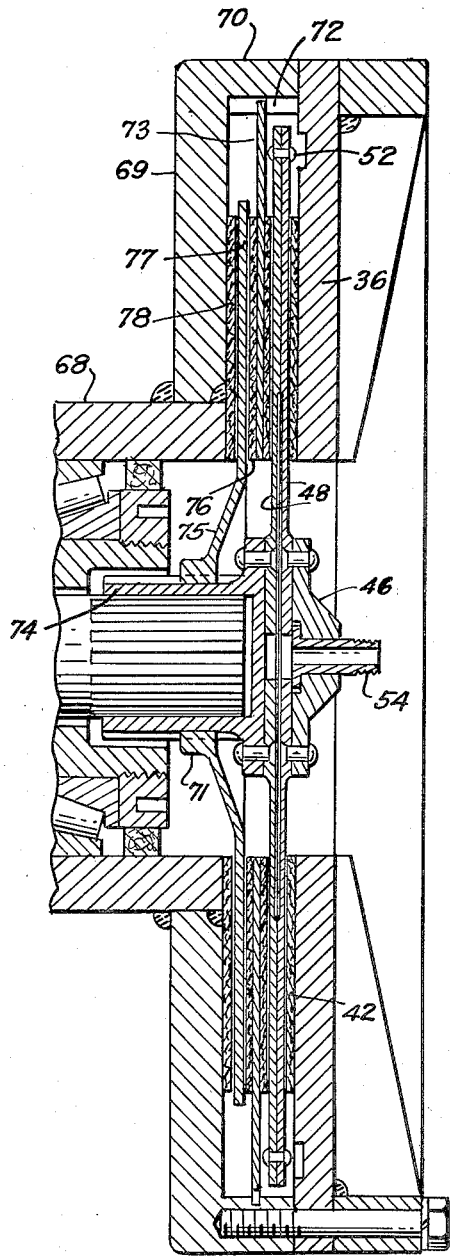

2 in cross-section of one embodiment of our improved clutch;

Figs. 2, 3, and 4 are fragmentary views in cross-section illustrating the response of the clutch disks to increased fluid pressure;

Fig. 5 is a view in cross-section through a clutch comprising a second embodiment of our invention; and Figs. 6 and 7 are views in cross section of two additional embodiments of the invention.

The invention is shown in the drawings as applied to a winch adapted for use with a tractor, as more fully explained in our co-pending application above referred. Secured to the tractor body (not shown) is a gear box or housing 10 in the lower portion of which is journalled a worm shaft 12 adapted to be driven from a power take-off shaft (not shown). A worm wheel 14 is disposed within the housing 10 in mesh with the worm 12 and fast upon a cross shaft 16.

Encompassing the cross shaft 16 is a cylindrical bearing support 18 having an integral radial flange 20 at its inner end which is secured to the housing 10 by means of a series of bolts 22. Within the inner end of the support 18 there is disposed a race of bearings 24 in which the shaft 16 is journalled. On its exterior surface the support 18 carries two sets of opposed tapered bearings 26 held in place by a locking ring threaded on the end of the support 18. A winch drum 28 is mounted on the bearings 26 for free rotation with respect to the support 18 and the shaft 16 and has a plain inner cheek 30 and an outer cheek plate 32 provided with an integral peripheral flange 34. A flat centrally apertured disk 36 is bolted to the flange 34 by means of a series of peripherally arranged bolts 38 and has a plurality of radially extending stiffening vanes 40 secured to its outer surface. The width of the flange 34 defines a radial pocket between the cheek plate 32 and the disk 36. Opposed portions of the walls of the pocket are covered with clutch facings 42 of conventional clutch lining material.

The end of the shaft 16 is provided with a series of straight splines which receive a correspondingly splined hub member 44. The hub 44 is locked for rotation with the shaft 16 but is floating axially, that is to say, it can move free along its axis of rotation. A complementary exterior hub 46 overlies the outer face of the hub 44 and a pair of disks or plates 48 of spring steel or other suitably stiff resilient material is clamped between the hubs 44 and 46 by a series of rivets 50. The outer margins of the plates 48 are sealed together by a series of rivets 52, it sometimes being necessary to coat the plates with a sealing compound to obtain an air-tight seal. The centers of the disks 48 are cut out and register with a bushing 54 journalled in the hub 46 around which the hub 46 may rotate and forming the terminus of a fluid conduit, not shown. One or both of the disks 48 is provided with a series of radially extending grooves 49 leading outwardly from the center hole to provide access for fluid entering through the bushing to reach between the disks 48. The disks 48 extend radially into the pocket between the clutch faces 42.

When the tractor winch is to be used, the shaft 16 is continuously driven and in turn drives the hubs 44 and 46 with the disks 48. The drum 28 is not driven until fluid is forced through the bushing 54 under pressure sufficient to flex the disks apart. Fig. 2 illustrates the relative positions of the various elements before fluid pressure is applied. Fig. 3 shows what happens under relatively light fluid pressure. The disks 48 have separated through an area widest at a semi-radius and narrowing at the outer and inner sealed edges thereof. The initial contact of the disks against the clutch faces on the pocket walls is practically a line contact. The area of contact increases with the pressure until the condition somewhat like that shown in Fig. 4 is reached. Then the greater portion of each disk is in frictional engagement with the clutch faces of the pocket walls. The line contact followed by a gradually increasing engaged area results in an extremely fine, smoothly operating power transmission, particularly valuable as a feature of a winch. Load conditions often require a preliminary light lift to permit adjustments to be made to the load hitch or rig and the clutch embodying our invention provides superlatively delicate and dependable operation.

From an observation of Fig. 1 it can be seen that the removal of the plate 36 and the conduit permits the bodily removal of the hub and disk assembly by merely sliding the hub 44 axially on the splined coupling until it is free from the shaft 16. Thus it is possible to manufacture pre-assembled clutch units comprising the pair of hubs 44 and 46, together with the disks 48. There are no adjustments to be made by a service man, since the floating feature of the hub 44 results in the great advantage of self-adjustment. That is to say, when the unit has been slipped on the splined end of the shaft 16, and the plate 36 and conduit replaced, the hub 44 will travel axially on the shaft 16 until it is so positioned as to center the disks 48 in the pocket between the clutch faces 42.

Furthermore it is a simple matter to put in new clutch faces, inasmuch as the surfaces to which they are secured are entirely exposed when the clutch unit is removed in the manner described.

A series of vents 58 around the periphery of the pocket, that is cut through the plate 36 between the vanes, offer passage for dirt and fragments of material which may collect in the pocket. Centrifugal force will cause such matter to work out through the vents in short order. In effect, then, the clutch of our invention is self-cleaning.

Another embodiment of our invention appears in Fig. 5, in which the general construction and organization of the elements of the mechanism is the same as described in conjunction with the embodiment shown in Figs. 1–4. The inner hub 60 has welded to it a relatively heavy inflexible disk 62 which extends into the radial pocket between the drum cheek 32 and the plate 36. The disk 62 is opposed to a clutch face 42 on the inner wall of the pocket.

An outer hub 64 is externally threaded to receive a lock nut 65 which seals a relatively light, stiff but resilient disk or plate 66 equal in area to that of the disk 62 and secured thereto at its outer margin by means of a series of peripherally arranged studs 69. The disk 66 is opposite a clutch face 43 secured on the outer wall of the pocket, that is to say, on the inner face of the plate 36. A bushing 68 is journalled in the hub 64 so as to remain stationary while the hub turns.

The construction is such that when air or liquid, or any suitable fluid is fed through the bushing 68 under pressure, hubs 60 and 64 tend to separate and the light disk 66 is bowed outwardly until it engages the clutch face 43, along a circle of relatively small radius. As the pressure is increased, the heavy plate 62 is forced into frictional engagement with the clutch face 42, while the light plate 66 bows still more and increases its contact area with the clutch face 43. Thus under low pressure conditions a relatively light rotative torque is applied to the winch drum, and under heavy pressure a very large torque is attained. The advantages of such an arrangement are exceedingly important in winch work.

In Fig. 6 we have shown a third embodiment of our novel clutch. In this case a winch drum 68 has an outer cheek plate 69 with an integral peripheral flange 70 on the inner surface of which a series of serrations or gear teeth 72 are cut. The plate 36 is bolted to the flange 70 by bolts 38, and a hub 74 has internal splines cooperating as before with the splines on the cross-shaft 16. However, the hub 74 is also externally splined to couple it to an auxiliary axially floating hub 71 which has a radial spider 75 carrying an integral disk 77 extending into the pocket between the cheek 69 and the plate 36. The inner face of the disk 77 is disposed opposite a clutch face 78 disposed on the wall of the cheek plate 69.

A relatively large disk 73 is provided with peripheral teeth engaging the teeth 72 on the flange 70 and thus lock for rotation with the winch drum but free to move axially in the pocket. The center of the disk 73 is cut out to encompass the hub 74.

As before, a hub 46 with a bushing 54 is disposed to overlie the end of the hub 74, and a pair of disks 48 are secured between the hubs by rivets 50. The outer margins of the disks 48 are sealed together by a series of rivets 52. A clutch facing 42 is secured to the inner surface of the plate 56, and the disk 73 carries a clutch facing 76 on each surface thereof.

When fluid pressure is applied through the bushing 54, the disks 48 bow apart and force the disk 73 to move inwardly to press the disk 77 into contact with the clutch facing 78 and also against the clutch facing 76. The inner disk 48 engages one of the clutch faces on the disk 73, while the outer disk 48 engages the facing 42 on the plate 36. In this form of the invention the frictional contact area is multiplied and an exceedingly powerful torque exerted on the winch drum. This arrangement is superlatively useful for heavy duty work, although the use of low pressure will result in delicately controllable operation.

The embodiment shown in Figure 7 is the same as that appearing in Figure 6 except that in this case the disks 48 are not sealed internally. Instead, the outer disk is riveted to a flange on the hub 46 and the inner disk is riveted to a flange on the hub 74. This embodiment of the invention offers the same advantages of the heavy duty model shown in Fig. 6 with the further advantage that the first application of pressure to the system operates to separate the hubs 46 and 74 and causes each of the disks 48 to bear in line contact with adjacent clutch facings along circles of relatively small radius. The range of torque thus available is tremendous and a winch equipped with this type of clutch can be used with equal facility for the lightest as well as for the heaviest type of work. Furthermore, the operation is completely flexible and immediately responsive to the fluid pressure which is easily regulated by a throttle valve under the hand of the operator.

Another advantage of our invention is that these clutch units can be made up at the factory and sent out complete, as a subcombination ready to be installed in the field, where they will require no adjustment or tinkering, or delicate interfitting into other parts of the device.

The foregoing description of the details of preferred embodiments of our invention is illustrative of only a few of the possible ways in which our invention may be applied in practice. For example, a clutch embodying the invention could be used to great advantage on machine tools and production machines of various types as well as in agricultural machinery of all kinds. Consequently the scope of the invention is not to be measured by the description herein but rather by reference to the appended claims.

We claim:

1. Power transmission device which comprises a shaft, walls forming a radial pocket disposed adjacent the end of said shaft, hub structure locked for rotation upon said shaft but floating axially thereon, a first disk locked to one of said pocket walls for rotation therewith but axially floating therein, an auxiliary hub mounted for rotation with said hub structure but axially floating thereon, a second disk secured to said auxiliary hub and interposed between one wall of said pocket and said first disk, a pair of resilient disks secured to said hub structure and interposed between said first disk and one of the walls of said pocket, and a conduit connected to said hub structure for introducing fluid between said pair of disks.

2. A clutch including a shaft, walls forming a radial pocket disposed adjacent one end of said shaft, hub structure mounted for rotation with said shaft, a disk disposed within said pocket and mounted for rotation therewith, an auxiliary hub mounted on said hub structure for rotation therewith, a plate secured to said auxiliary hub and interposed between said disk and one wall of said pocket, a pair of plates secured to said hub structure and interposed between said disk and the other wall of said pocket, and fluid pressure-responsive means for separating said pair of plates.

3. A clutch which comprises a shaft, walls defining a radial pocket disposed adjacent said shaft and rotatable independently therefrom, a hub locked for rotation upon said shaft but floating axially thereon, a first disk secured to said hub; a second disk secured around its periphery to said first disk beyond said shaft said disks being disposed in said pocket and said second disk being free of any shaft except through said first disk; and means for introducing fluid in between said disks for separating them and thereby effecting contact between said walls and members rotated by said shaft.

4. A clutch, including a shaft having an axially grooved male end; walls defining a radial pocket disposed adjacent the end of said shaft and rotatable independently therefrom; a hub member having axial grooves in its internal bore adapted to interlock slidably with the corresponding grooves on said male end; a complementary hub member having a bore therein; a conduit fitting rotatably in said second named bore; a pair of disks, at least one of which is resilient, secured between said hub members and sealed together in an airtight fit near their outer peripheries, whereby upon the introduction of fluid pressure through said conduit at least one of said disks is flexed apart axially from the other and contact is effected which transmits to said walls motion from said shaft, the degree of transmission depending on the pressure of said fluid and the area of contact of said resilient disk.

5. The clutch of claim 4 in which both of said disks are resilient and their flexing apart results in a gradually increased area of contact with the pocket walls as said pressure is increased.

6. The clutch of claim 4 in which one of said disks is relatively rigid and the introduction of fluid results in said rigid disk contacting one said wall and in said resilient disk contacting another said wall over a gradually increasing area as said pressure is increased.

7. A clutch, including a shaft having an axially grooved male end; walls defining a radial pocket disposed adjacent the end of said shaft and rotatable independently therefrom; a hub member having axial grooves in its internal bore adapted to interlock slidably with the corresponding grooves on said male end; a complementary hub member having a bore therein; a conduit fitting rotatably in said bore of said complementary hub member; a pair of resilient disks secured together between said hub members with air passageways between them and said bore and also secured together in an airtight fit near their outer peripheries, whereby upon the introduction of fluid pressure into said conduit said disks are flexed apart axially from each other and contact is effected which transmits to said walls motion from said shaft, the degree of transmission depending on the pressure of said fluid and the area of contact of said resilient disks.

8. A clutch which comprises a shaft; walls defining a radial pocket disposed adjacent said shaft and rotatable independently therefrom; a hub locked for rotation upon said shaft but floating axially thereon; a first resilient disk secured to said hub; a second resilient disk sealed around its periphery to said first disk and beyond the end of said shaft, said disks being inside said pocket; and means for introducing fluid in between said disks for flexing them outwardly and thereby effecting contact between them and said walls, the area of said contact increasing with an increase in fluid pressure.

OSCAR R. PETERSON.
ROBERT A. PETERSON.

(References on following page)

REFERENCES CITED

The following references are of record in the file of this patent:

UNITED STATES PATENTS

| Number | Name | Date |
|---|---|---|
| 427,085 | Jones | May 6, 1890 |
| 679,365 | Darling | July 30, 1901 |
| 1,045,918 | Viele | Dec. 3, 1912 |
| 1,048,299 | Dickson | Dec. 24, 1912 |
| 1,180,947 | Scott | Apr. 25, 1916 |
| 1,806,009 | Whitacre | May 19, 1931 |
| 2,087,380 | Kress | July 20, 1937 |
| 2,183,761 | Aspinwall | Dec. 19, 1939 |
| 2,307,456 | Fawick | Jan. 5, 1943 |
| 2,381,941 | Wellman et al. | Aug. 14, 1945 |
| 2,442,510 | Peterson et al. | June 1, 1948 |

FOREIGN PATENTS

| Number | Country | Date |
|---|---|---|
| 372,825 | France | Apr. 19, 1907 |